(12) United States Patent
Kanyuk et al.

(10) Patent No.: US 9,214,036 B1
(45) Date of Patent: Dec. 15, 2015

(54) ANIMATION ENGINE FOR BLENDING COMPUTER ANIMATION DATA

(71) Applicant: Pixar, Emeryville, CA (US)

(72) Inventors: Paul Kanyuk, San Francisco, CA (US); Jeong Wook Park, Emeryville, CA (US); Samantha Raja, Berkeley, CA (US)

(73) Assignee: PIXAR, Emeryville, CA (US)

( * ) Notice: Subject to any disclaimer, the term of this patent is extended or adjusted under 35 U.S.C. 154(b) by 287 days.

(21) Appl. No.: 13/828,260

(22) Filed: Mar. 14, 2013

Related U.S. Application Data

(60) Provisional application No. 61/664,674, filed on Jun. 26, 2012, provisional application No. 61/664,682, filed on Jun. 26, 2012.

(51) Int. Cl.
*G06T 13/40* (2011.01)
*G06T 13/80* (2011.01)

(52) U.S. Cl.
CPC .................. *G06T 13/40* (2013.01); *G06T 13/80* (2013.01)

(58) Field of Classification Search
None
See application file for complete search history.

(56) References Cited

U.S. PATENT DOCUMENTS 6,088,042 A * 7/2000 Handelman et al. .......... 345/473

OTHER PUBLICATIONS

Kovar, Lucas, Michael Gleicher, and Frédéric Pighin. "Motion graphs." ACM transactions on graphics (TOG). vol. 21. No. 3. ACM, 2002.*

Zhongyu, Chen, and Zhu Xiangbin. "A Motion Blending Approach Based on Unsupervised Clustering." Artificial Reality and Telexistence—Workshops, 2006. ICAT'06. 16th International Conference on. IEEE, 2006.*

Tang, Bing, et al. "Simulating reactive motions for motion capture animation." Advances in Computer Graphics. Springer Berlin Heidelberg, 2006. 530-537.*

Kim, Tae-Yong, and Eugene Vendrovsky. "DrivenShape: a data-driven approach for shape deformation." Proceedings of the 2008 ACM SIGGRAPH/Eurographics Symposium on Computer Animation. Eurographics Association, 2008.*

Iben, H. et al., "Artistic Simulation of Curly Hair", Technical Memo 12-03a, Pixar Animation Studios (Jun. 2012, unpublished) [later published in *SCA '13*, Proceedings of the 12th ACM SIGGRAPH/Eurographics Symposium on Computer Animation, (Jul. 19, 2013), pp. 63-71, 9 pages, New York, NY, USA].

Kanyuk, P. et all., "Headstrong, Hairy, and Heavily Clothed: Animating Crowds of Scotsmen", Presentation at SIGGRAPH 2012, (Aug. 7, 2012), 1 page.

Soares, O. et al., "Curls Gone Wild: Hair Simulation in Brave", ACM SIGGRAPH 2012 Talks, (Aug. 2012), 1 page, Article No. 22, New York, NY, USA.

* cited by examiner

*Primary Examiner* — Daniel Hajnik

(74) *Attorney, Agent, or Firm* — Kilpatrick Townsend & Stockton, LLP

(57) ABSTRACT

Computer-generated images are generated by evaluating point positions of points on animated objects in animation data. The point positions of the points are used by an animation system to determine how to blend animated sequences or frames of animated sequences in order to create realistic moving animated characters and animated objects. The methods of blending are based on determining distances or deviations between corresponding points and using blending functions with varying blending windows and blending functions that can vary from point to point on the animated objects.

11 Claims, 12 Drawing Sheets

ANIMATION ENGINE FOR BLENDING COMPUTER ANIMATION DATA

CROSS-REFERENCES TO RELATED APPLICATIONS

This application is a non-provisional application of and claims the benefit of priority of U.S. Provisional Patent Application No. 61/664,674, and U.S. Provisional Patent Application No. 61/664,682, both filed on Jun. 26, 2012, which are incorporated by reference in their entirety for all purposes.

BACKGROUND

The present disclosure relates generally to methods and system for blending animation data to generate realistic computer animation.

Computer animation involves specifying objects, their behavior, lighting, etc. and submitting data representing animator selections to an animation system that reads that data and performs the necessary calculations to determine how objects in a virtual or simulated environment would behave, move, look, etc. The animation result is then often rendered for display on a 2D or 3D display. In modern animation, the demands for visual expression prevent an animator from manually specifying the specific details of each pixel in each frame of animation. Instead, the animator specifies objects, lighting, effects, and their characteristics and the animation system computes frames of animation images that might represent what the animator specified.

Creating realistic animated sequences can present difficulties depending on the number of moving objects and characters in a given animated sequence. The movement of the animated objects and characters themselves may also present problems in easily generating realistic animated sequences.

Previously, some animators would choose to animate certain "major" characters while leaving other background characters as static and unchanging. However, this would result in less realistic and dynamic animated sequences.

Solutions that tried to address the issue required significant expenditure of time and energy. For example, the movement of the object could be specified point-by-point, frame-by-frame. The animator could specify inputs or constraints, such as the (x, y, z) coordinates of an elbow, leg, bone, anchor point, etc. for a collection of object points at a collection of times, and a kinematics engine could specify positions of those objects in each frame, applying those constraints. If an object entirely followed kinematically specified constraints, the animator could simply specify the constraints for an edge (e.g., start or finish) of a clip and the animation of the object would result in the object being at the same position at the start and finish of a clip.

However, this process can be tedious or intractable depending on the number of animated objects present in a particular scene, as the animator would be required to specify inputs or constraints for each and every object and character. Such is the case in animated sequence including a significant number of objects or characters (e.g., hundreds of animated characters in flowing garments or with flowing hair). Also, as some objects, such as hair or clothing, have no natural joints which can be constrained, animating point-by-point and frame-by-frame may produce less natural movement.

Jitter may also be an issue that arises with animation data. In order to reduce jitter caused by fast moving animated objects, one solution is to specify the inputs or constraints for an object (e.g. hair or cloth) along with the animated character. This solution also has the drawback of being difficult and time-consuming as the number of animated characters increases.

In some solutions, blending is done by running a simulation engine for the animated sequence and when two animated sequences are joined, simply blending the positions of points based on a fixed window. However, this solution may not consistently provide a seamless blend as uniform blending often introduces intersections in the animated model, such as a garment intersecting the body of an animated character.

Other solutions attempt to merely average point positions of an object across multiple frames and then use an average value as a new point position. However, this solution creates additional problems when the animated sequence involves fast motion, resulting in loss of sync between an animated character and the animated character's clothing or hair. For example, if the animated character moved a significant distance in a short period of time, the average point position of the clothing across multiple frames may not create enough movement, resulting in increased jitter.

Accordingly, what is desired are improved methods and apparatuses for solving some of the problems discussed above with respect to rendering realistic animated images, while reducing at least the drawbacks described above.

BRIEF SUMMARY

Embodiments of the present invention can determine how to blend animated sequences or frames of animated sequences in order to create realistic moving animated characters and animated objects. For example, an animation system can determine how to blend the animated sequences or frames of animated sequences based on determining distances (deviations) between corresponding points on moving animated objects and using blending functions and/or varying blending windows that can vary from point to point on the animated objects.

According to one embodiment, a method blends at least two animation sequences being joined such that objects are viewed as having continuity across a join of sequences. A set of points for an object are determined, the points representing separate portions of the object. First positions of the set of points at an end of a first animation sequence and second positions of the set of points at a start of a second animation sequence that is to be appended to the end of the first animation sequence are determined. The method further comprises determining deviations between the first positions and the second positions, and determining a blend weighting function for each point of the set of points based on the deviations. Blend positions for each point for each frame in a plurality of frames in a blending window are determined. The blend positions are determined by the blend weighting function for each point. The determined blend positions are used to generate blended frames of animation data.

According to another embodiment, a method determines an adjusted position for an object in animated data to reduce jitters in the animated data. For each point in a set of points representing separate portions of the object, an unfiltered point position for the point in a given frame of animated data is determined. The unfiltered point position represents the position of the point in the given frame of animated data. A plurality of point positions for the point from a set of frames of animated data surrounding the given frame are retrieved, and a filtered position is determined. The filtered position is an average of the plurality of point positions. The method further comprises determining a distance between the filtered position and the unfiltered position, and determining the adjusted position for the point based on the determined distance.

Other embodiment are directed to systems and computer readable media associated with methods described herein.

A better understanding of the nature and advantages of the present invention may be gained with reference to the following detailed description and the accompanying drawings.

DETAILED DESCRIPTION

Figure 1:
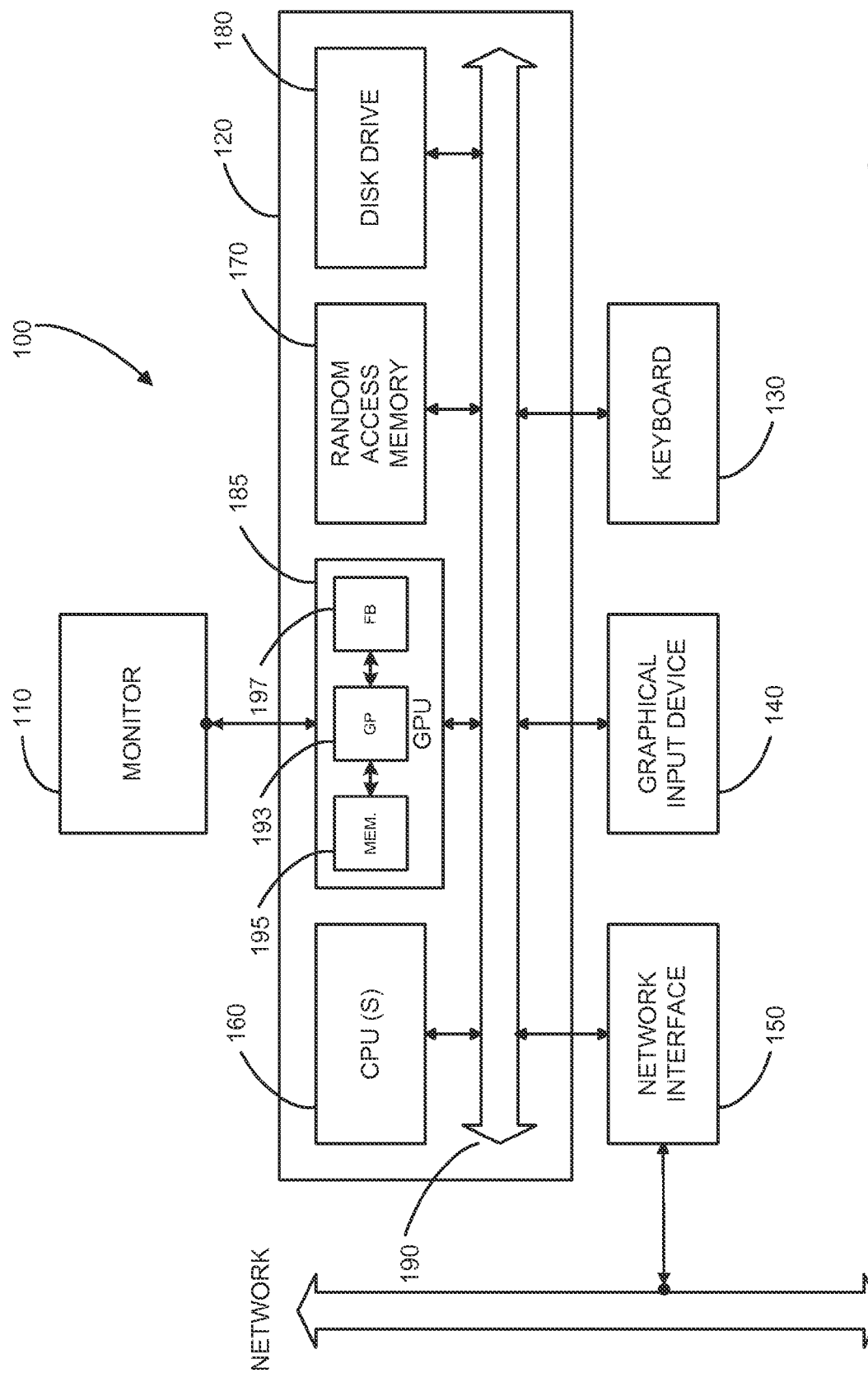
FIG. 1 illustrates a general-purpose computing system suitable for implementing some embodiments of the invention.

Creating computer-generated animation involves specifying animated models (e.g., characters, objects, backgrounds) and their behaviors, as well as the environments the models will be placed in and/or interact with. This process further involves providing animation data representing an animator's specifications to an animation system that reads the animation data and performs the requisite calculations to determine how to realistically model and render the animated data into a virtual or simulated environment. This process includes determining not just the physical look of the animated models, but also determining accurate movements and behaviors for the animated models.

Some situations may call for blending of animated characters or objects. For example, cloth simulation for animated sequences involving a large number of characters in a crowd, or matching animated objects to quickly moving animated characters. Manually creating animation data for each character in a large crowd can provide challenges. Some animators may choose to animate certain "major" characters while leaving other background characters in the crowd as static and unchanging. Others may try to generate short sequences of animation and blend the short sequences together to present the appearance of longer sequences.

One embodiment of the present invention can determine how to blend animated sequences or frames of animated sequences in order to create realistic moving animated characters and animated objects. For example, an animation system can determine how to blend the animated sequences or frames of animated sequences based on determining distances or deviations between corresponding points on moving animated objects and using blending functions and/or blending windows that can vary from point to point on the animated objects.

A brief description of exemplary systems that may be used to practice some embodiments of the invention are first provided.

I. Blending Animation Data

In some situations, an animator may desire to blend computer animation data in order to create realistic animated sequences. In other situations, a short animated sequence may be looped in order to present the appearance of a longer animated sequence.

Animated sequences might be blended because there is a desire to transition from a first animated sequence to a second animation sequence without having a noticeable change at the join position. In some cases, an animation sequence is "looped" (i.e., the end of the animation sequence is blended with the start of the same animation sequence so that the loop can be replayed), perhaps within a scene where other objects' animations are not looped. Looping the animated sequence by blending the start and end of the animated sequence may be accomplished with little or no noticeable discontinuities. An example of where looping is useful is in a scene where main characters are moving in a sequence that is important to a story line while additional characters form a background for the scene and move in loops, or perhaps just their clothing moves in loops. The characters in the background may not be essential to the plot of the animated sequence, but may be used to provide a more realistic and vibrant animated sequence.

Blending is often used to provide a visually pleasing transition between one animated sequence and another animated sequence. An animated sequence might include objects that are moving and so it is preferable that the movement and placement of an object, or parts of an object, in one animated sequence be continuous with the movement and placement of an object in an adjacent animated sequence.

The animator may want to blend computer animation data in order to reduce jitter and pops in animation sequences caused by rapid movement of animated objects.

II Exemplary Systems

FIG. 1 is a block diagram of a computer system 100 that may be used to implement or practice various embodiments of an invention whose teachings may be presented herein. FIG. 1 is merely illustrative of a general-purpose computer system or specific information processing device for an embodiment incorporating an invention whose teachings may be presented herein and does not limit the scope of the invention as recited in the claims. One of ordinary skill in the art would recognize other variations, modifications, and alternatives.

In one embodiment, computer system 100 can include a monitor 110, a computer 120, a keyboard 130, a graphical input device 140, a network interface 150, and/or the like.

Monitor 110 may typically include familiar display devices, such as a television monitor, a cathode ray tube (CRT), a liquid crystal display (LCD), or the like. The monitor 110 may provide an interface to the graphical input device 140, such as incorporating touch screen technologies.

The computer 120 may typically include familiar computer components, such as a processor 160 and one or more memories or storage devices, such as a random access memory ("RAM") 170, one or more disk drives 180, a graphics processing unit ("GCU") 185, and/or the like. Computer 120 may include a system bus 190 interconnecting the above components and providing functionality, such as inter-device communication.

In further embodiments, the computer 120 may include one or more microprocessors (e.g., single core and multi-core) or micro-controllers, such as PENTIUM™, ITANIUM™, or CORE™ 2 processors from Intel® of Santa Clara., Calif. and ATHLON™, ATHLON™ XP, and OPTERON™ processors from Advanced Micro Devices of Sunnyvale, Calif. Further, the computer 120 may include one or more hypervisors or operating systems, such as WINDOWS®, WINDOWS® NT, WINDOWS® XP, WINDOWS VISTA®, or the like from Microsoft®, SOLARIS™ from Sun Microsystems®, LINUX™, UNIX®, and UNIX®-based operating system.

In various embodiments, the graphical input device 140 may typically be embodied as a computer mouse, a trackball, a track pad, a joystick, a wireless remote, a drawing tablet, a voice command system, an eye tracking system, or the like. The graphical input device 140 may allow a user of computer system 100 to select objects, icons, text, user interface widgets, model or rigging elements or handles, or other user interface elements that appear on the monitor 110 via a command, such as a click of a button or the like on the graphical input device 140.

In some embodiments, the network interface 150 may typically include a communications interface, an Ethernet card, a modem (telephone, satellite, cable, ISDN), (asynchronous) digital subscriber line (DSL) unit, FireWire interface, USB interface, or the like. For example, the network interface 150 may be coupled to a computer network, to a FireWire bus, a USB hub, or the like. In other embodiments, the network interface 150 may be physically integrated as hardware on the motherboard of the computer 120, may be implemented as a software program, such as soft DSL or the like, or may be implemented as a combination thereof.

In various embodiments, the computer system 100 may also include software that enables communications over a network, such as the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to the computer system 100.

The RAM 170 and disk drive 180 are examples of machine-readable articles or computer-readable media configured to store information, such as computer programs, executable computer code, human-readable source code, shader code, rendering engines, or the like, and data, such as image files, models including geometrical descriptions of objects, ordered geometric descriptions of objects, hierarchies of models, procedural descriptions of models, scene descriptor files, or the like. Other types of computer-readable storage media or tangible machine-accessible media include floppy disks, removable hard disks, optical storage media such as CD-ROMs, DVDs and bar codes, semiconductor memories such as flash memories, read-only-memories (ROMS), battery-backed volatile memories, networked storage devices, or the like.

In some embodiments, the GPU 185 may include a conventional graphics processing unit. The GPU 185 may include one or more vector or parallel processing units that may be user programmable. Such GPUs may be commercially available from NVIDIA®, ATI™, and other vendors. In this example, the GPU 185 can include one or more graphics processors (GP) 193, a number of memories and/or registers (MEM.) 195, and a number of frame buffers (FB) 197.

As explained, FIG. 1 is merely representative of a general-purpose computer system or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may include techniques described above as implemented upon a chip or an auxiliary processing board.

Figure 2:
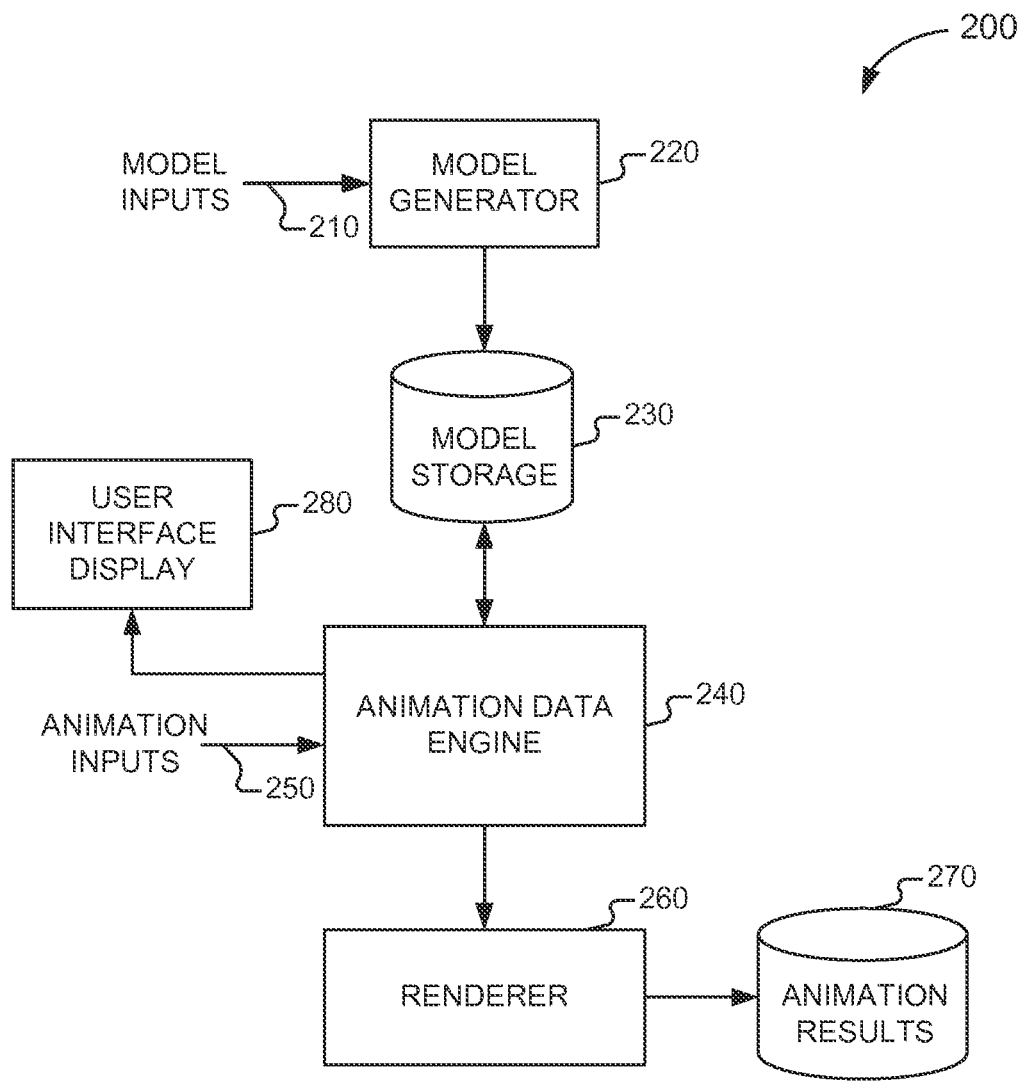
FIG. 2 illustrates a block diagram of components of a system that may be used to practice some embodiments of the invention.

FIG. 2 illustrates an animation system 200 that might be used to generate animated images. Various components of the animation system 200 can be implemented in software, hardware or a combination thereof. It should be understood, even if not explicitly displayed, that functionality can be represented by programming instructions stored in memory suitable for being read by a processor that in turn executes those programming instructions. Using the animation system 200, an animator can generate computer models and animation using those models. As illustrated, the animation system 200 may comprise a model generator 220, a model storage unit 230, an animation data engine 240, a renderer 260, an animation results storage unit 270, and a user interface display 280.

As noted, the animation system 200 comprises the model generator 220 that is capable of generating animated models from model inputs 210. The model inputs 210 can be inputs from a user interface, from another computer process, from model storage 230 or other sources.

In some embodiments, the model generator 220 may receive one or more pre-generated animated models as model inputs 210. In some embodiments, the model inputs 210 can be models of objects and/or characters, or data created by an animator that allows the model generator 220 to create models of objects and/or characters.

In other embodiments, the animated models may be pre-generated and pre-modeled prior to being sent as animation input 250 to the animation system 200. In such embodiments, the animation system 200 may not need to access the model generator 220 for the animated models. In other embodiments, some animated models may be sent as animation input 250, while other animated models are generated by the model generator 220 based on model inputs 210. The animation inputs 250 may also include animated data including frames of animated sequences that are to be joined or appended to each other. The animation inputs 250 may also include animation settings, including user-defined constraints such as minimum thresholds and maximum thresholds that the animation data engine 240 may utilize in order to blend animation sequences.

The animated models may be stored in the model storage unit 230 and accessed when required. In some embodiments, the model storage unit 230 can store full sequences of animated data. The full sequences of animated data can include object, character, and motion data. The animated data can be of varying lengths.

The animation data engine 240 can read and modify animated models, present data, objects, controls, etc. on the user interface display 280 and receive animation inputs 250 in order to determine which models to use, where, how and how to manipulate them to form particular animated images. In some embodiments, the animation data engine 240 can be configured to determine the movement of an animated object visible in the animated data based on user constraints and configurations.

In some embodiments, the animation data engine 240 may utilize data provided as model inputs and/or animations inputs in order to realistically blend animated sequences. The animation data engine 240 may be configured to blend a single animated sequence into a looping sequence, or may be configured to blend two or more frames of separate animated sequences. In order to blend animation data, the animation data 240 may be configured to determine points on animated objects contained in the animation data, and use the point to determine deviations between corresponding points on two or more frames or sequences of animated data.

The data generated by the animation data engine 240 may be provided to the renderer 260 in order to generate animation results, which may be in the form of a sequence of animated images. In some embodiments, the animation results outputted by the rendered 260 may be stored in an animation results storage unit 270.

III. Weight Functions for Blending Animation Data

A. Point Positions on Animated Objects

In some embodiments, blending between frames of animated sequences of one or more objects is performed by considering a first animated sequence and a second animated sequence that are to be joined, and positions of objects, or points or features of those objects, at the end of the first animated sequence and the start of the second animated sequence. In other embodiments, the frames to be joined can be at any other points within the animation sequences.

Figure 3:
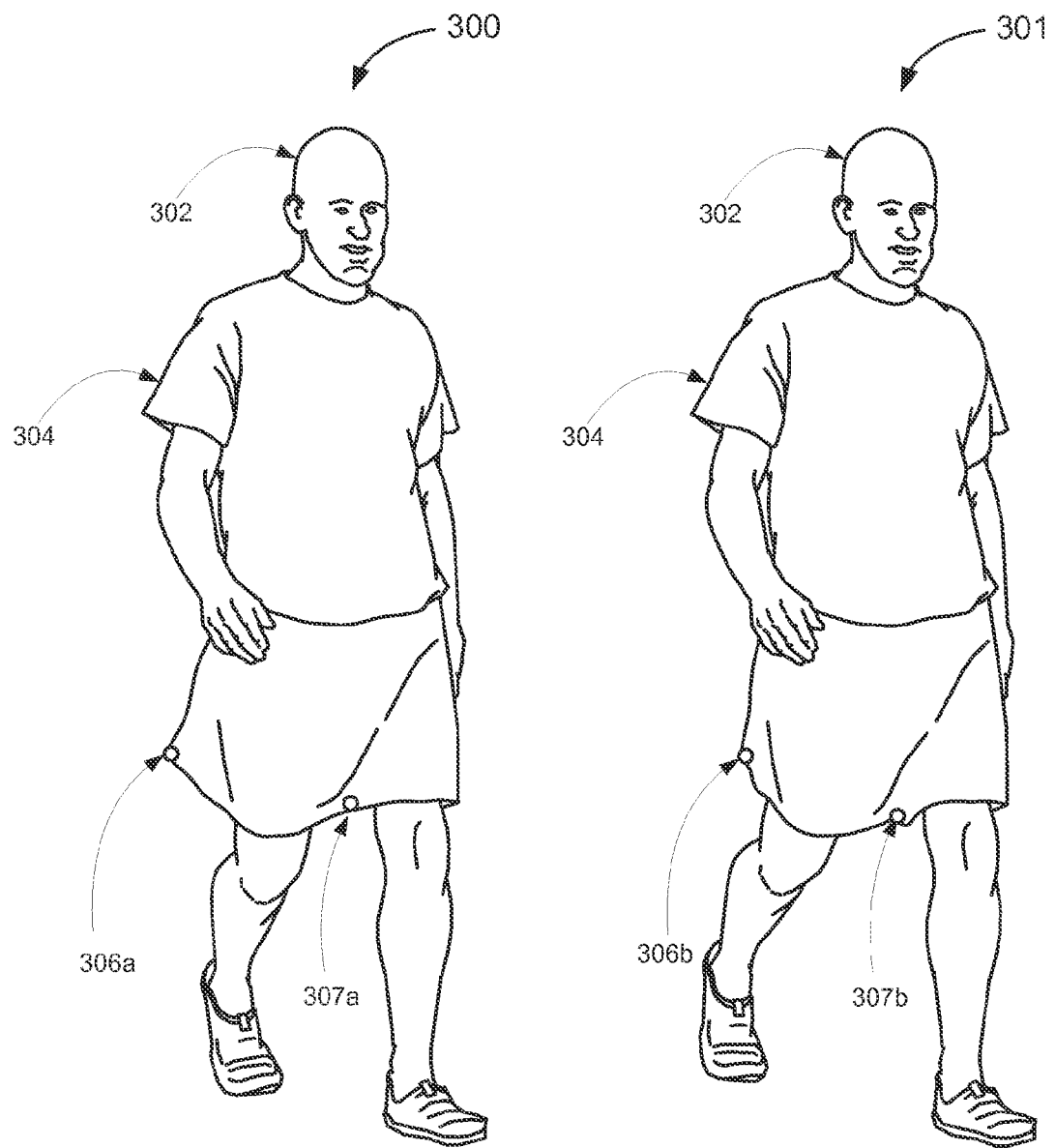
FIG. 3 illustrates exemplary frames of an animated character in two sequences of animated data that may be used to practice some embodiments of the invention.

FIG. 3 illustrates exemplary frames of an animated character 302 in two sequences of animated data that may be used to practice some embodiments of the invention. The first frame 300 depicts the animated character 302, and accompanying garment 304, in a first pose. The second frame 301 depicts the animated character 302, and accompanying garment 304, in a second pose.

The animated character 302 in the first frame 300 and the second frame 301 can be generated using a kinematics engine such that the coordinates of portions of the animated character (e.g., elbow, leg, arm) are specified by the animator for each frame. However, in order to generate animated data for the garment 304 that depicts realistic movement (e.g., flowing cloth), the garment 304 may be animated in compliance with dictates of a physics engine or simulation that applies forces from wind, character movement, interactions, etc., to the garment 304 and determines new positions in various frames for the garment 304 based on the rules applied by the simulation engine.

Point positions for animated models are used to indicate separate portions of the animated model. For example, point positions 306a and 307a are the position of the particular portions of the garment 304 in the first frame 300. The data for points 306a and 307a can include position and time data. For example, the data for point position 306a can indicate the x, y, and z coordinates for the specific position of the animated object at point position 306a at a given time, t.

Point positions 306a and 307a are merely exemplary point positions for the garment 304. In some embodiments, there may be a large number of point positions for the garment 304 or other animated object. In other embodiments, there may be a small number point positions. In some embodiments, when there is a greater the number of point positions, there is more detailed position data for the animated object.

B. Deviations Between Point Positions

Figure 4:
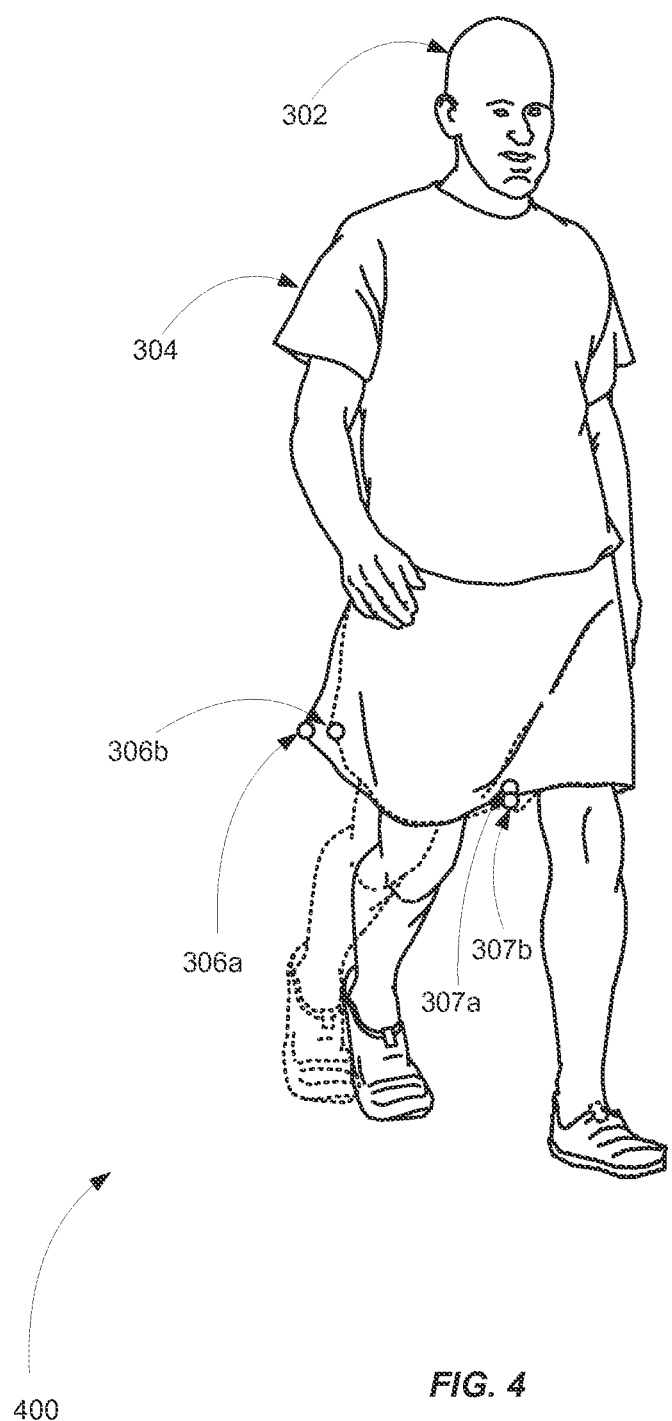
FIG. 4 illustrates an overlay of the frames from the two sequences of animated data depicted in FIG. 3 that may be used to practice some embodiments of the invention.

The first frame 300 and the second frame 301 in FIG. 3 illustrate the different positions of corresponding point positions in each of the two frames. Various point positions on the garment 304 will have positions in space in the first frame and will have positions in space in the second frame, and the positions in space may not be the same between frames. When the first frame 300 and the second frame 301 are to be joined (as shown in FIG. 4), it results in positional differences of corresponding point positions. For example, point positions 306a and 306b represent the same point on the garment 304, but the x, y, z, and t values for 306a and 306b are different. The similar is true with point positions 307a and 307b.

The spatial differences between corresponding point positions on the first frame 300 and the second frame 301 are the deviations for the point positions. The deviations may be different for each point position, and is dependent on the movement of the garment 304. Some portions of the garment 304 may move a larger amount than other portions and thus would result in a larger deviation.

The units for the deviation and what constitutes a low deviation and a high deviation, may vary based on the characteristics of the animated object. In some embodiments, garments that are more tight-fitting, and thus move less independent of a kinematically moved animated character, may exhibit low deviations (where the character itself is in the same pose at the end of the first animated sequence and at the start of the second animated sequence), whereas loose-fitting clothes that are free to be pulled along by a character, bumped, or effected by force fields (e.g., wind), may exhibit higher deviations even when those clothes are on a character that is in the same position at the end of the first animated sequence as at the start of the second animated sequence. For example, where the object is a kilt worn by an animated character, which is a less form-fitting garment that can flow independently, a low deviation may be 1 cm while a high deviation may be 10 to 15 cm.

C. Blend Weighting Functions Based on the Deviations

Blending two animated sequences containing an animated object can be performed by considering a first animated sequence and a second animated sequence that are to be joined and the positions of the object, or points or features of the object, at the end of the first animated sequence and the start of the second animated sequence. In the example frames in FIG. 3, the sequence of the animation is such that the second frame 301 immediately follows the first frame 300 in the joined animated sequence. In some embodiments, the first frame 300 and the second frame 301 are from different animated sequences. In some embodiments, where a single animated sequence is looped, the second animated sequence may be a copy of the first animated sequence.

A variable blending weight function may be used to blend the animated sequences. In some embodiments, the blending weight function for each point depends on the deviation from the first animated sequence to the second animated sequence for each point position. As the deviation between point positions may vary, the blending weight functions may vary. Thus, the blending weight function for blending point positions 306a and 306b, and the blending weight function for blending point positions 307a and 307b may be different. In some embodiments, the blending weight function may be stored data, expressed as a mathematical function, represented by program instructions, or be a formula that can be computed by a processor in the animation system 200.

Figure 5:
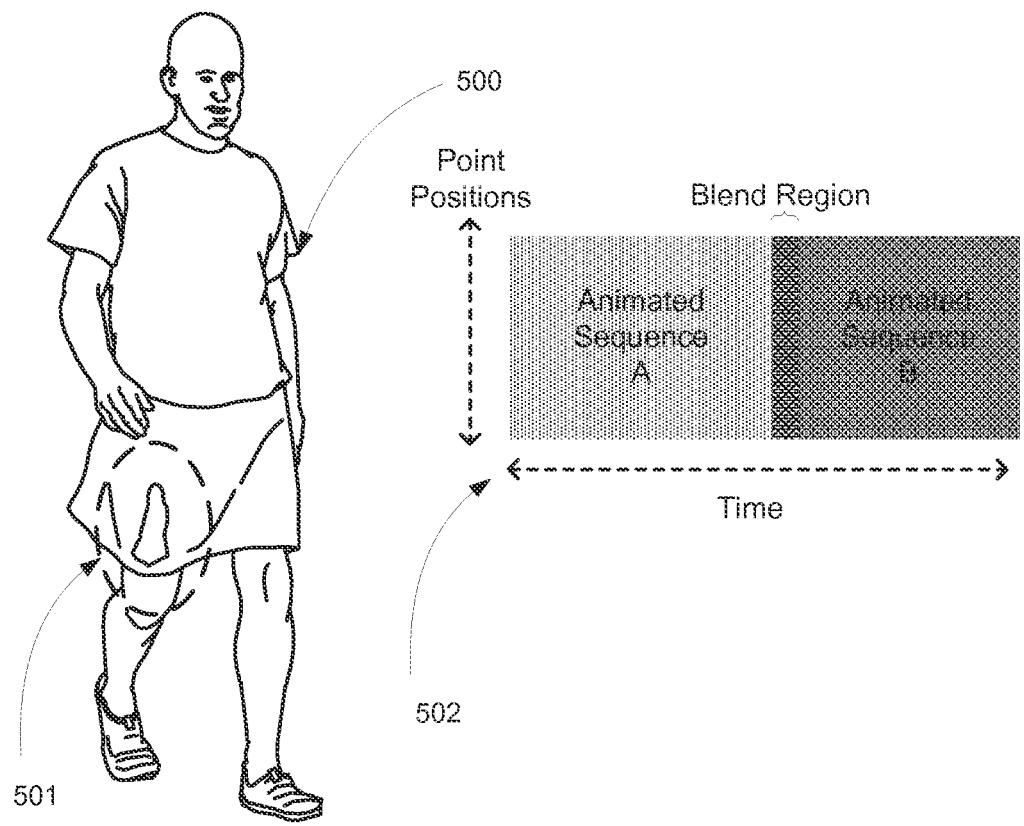
FIG. 5 illustrates the result of a uniform blending of the frames from the two sequences of animated data depicted in FIG. 3.

FIG. 5 illustrates an animated model 500 following a blending done by running a simulation engine for the animated sequences where the blending is uniform across all points of the animated object. However, this solution may not consistently provide a seamless blend as uniform blending often introduces intersections 501 in the animated model 500, such as a garment intersecting with the body of an animated character. As shown on the charted graph 502, the amount of blending at each point in the blend region is the same for each point of the animated object in the animation sequence (i.e., a uniform blending window) regardless of any deviations between the animated sequences.

Blending using a variable blending weight function for each point may result in a blended animation sequence with less intersections. For example, the blending weight function may have a value of 0 on a first animated sequence, and a value of 1 on a second animated sequence. In this example, the blending weight function for point position X may be a smoothstep function, such that the blending weight function has a value of 0 during the first animated sequence, before a blend window begins, moves from 0 to 1 during the blend window, and has a value of 1 during the second animated sequence after the blend window ends. It should be understood that the values of the blending weight function may be any values, and not limited to 0 and 1. Regardless, the slope of the smoothstep function representing the blend positions across the blend window starts at 0 and ends at 0. When a blending weight function for point position X is determined, the blend position of point position X given the blending weight function for point position X, w(X), is:

$$X_{BlendedPosition} = X1_{Position} + [w(X) \times (X2_{position} - X1_{position})]$$

$X1_{Position}$ is the position of point position X in the first animated sequence, and $X2_{position}$ is the position of point position X in the second animated sequence. The blending weight function and the size of the blend window (i.e., the number of frames it takes the blending weight function to go from 0 to 1) may depend on the deviation between the two animated sequences.

In some embodiments, the point positions near the beginning and end of the animated sequences may be repositioned by averaging over a blend window in time. The size of the blend window may be varied based on a variety of factors: the magnitude of the deviations for each point position (small deviations have small blend windows to avoid intersection with collision bodies, large deviations have larger blend windows), and per garment window sizes (tight garments have smaller blend windows, loose garments have larger blend windows). In some embodiments, a set of objects may have preferred blend window sizes or ranges (i.e., a static blend window size), but the blending weight functions for each point may still vary based on the point-by-point deviations within that object. Thus, there may be a point-by-point "effective" blend window size while the overall object has the static blend window size.

D. Exemplary Method

Figure 6:
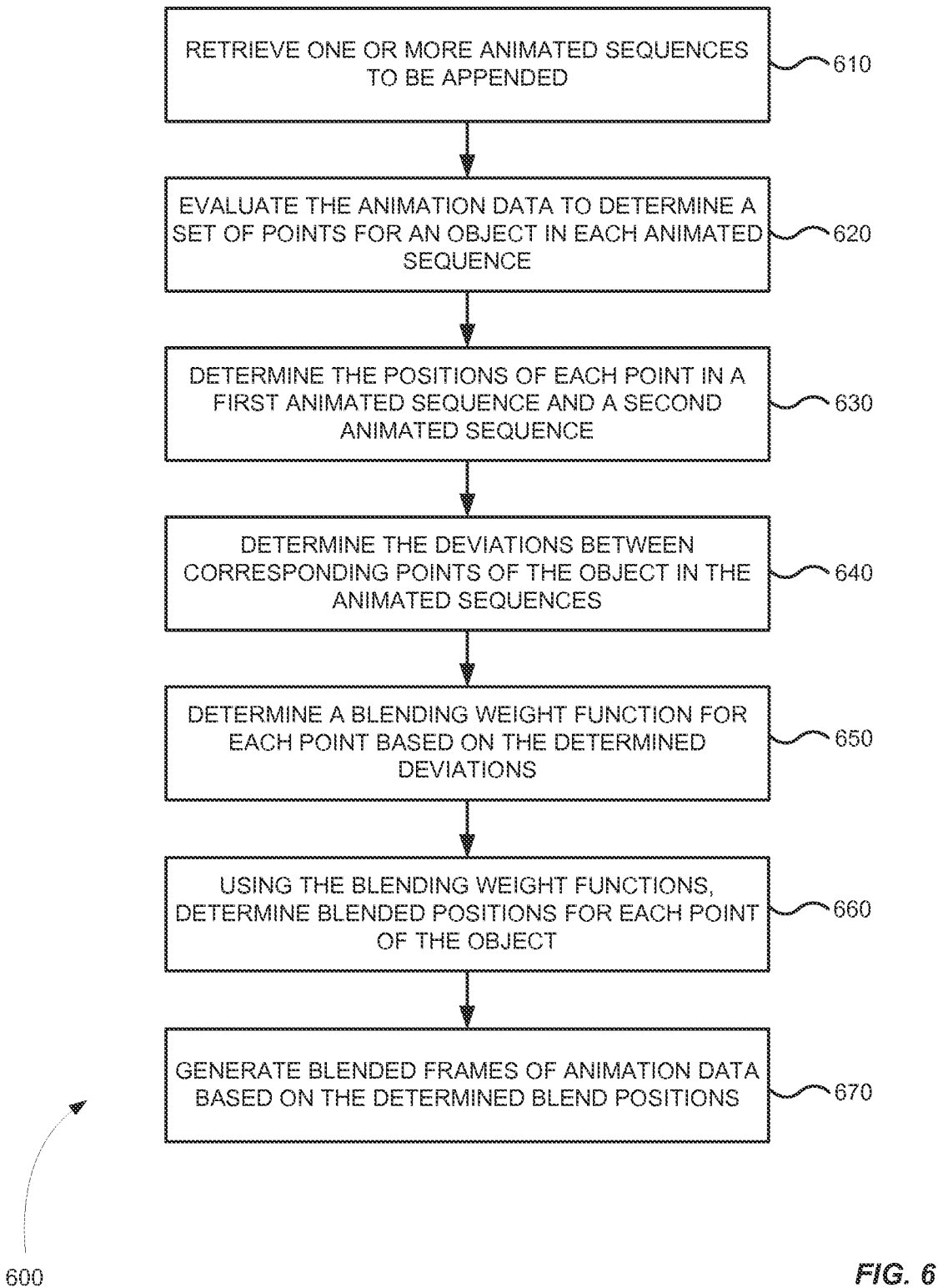
FIG. 6 is a simplified flowchart of a method in various embodiments for blending animated sequences.

FIG. 6 is a flowchart illustrating a method 600 of operation of an animation system for blending animated sequences. In some embodiments, the method 600 is performed to evaluate each animation variable associated with a frame of animated data. The processing depicted in FIG. 6 may be performed by software modules (e.g., instructions or code) executed by a processor of a computer system, by hardware modules of an electronic device, or combinations thereof.

As illustrated in FIG. 6, the method begins 610 with the animation system 200 retrieving one or more animated sequences to be appended or joined. In some embodiments, the animation system 200 may retrieve one animated sequence that will be joined to itself to create a loop of animated data. In other embodiments, the animation system 200 may retrieve two or more animated sequences that are to be appended or joined together. The animated sequences may be inputted by a user into the animation system 200 as preformed animation inputs 250 or may be generated by the model generator 220 based on user specifications and model inputs 210. The animated sequences may be in the form of animation data.

Once the one or more animation sequences are retrieved, in step 620, the animation system 200 evaluates the animation data to determine a set of points for an object in each of the one or more animated sequences. In some embodiments, the animation data may include more than one object. In such embodiments, the animation system 200 may determine a separate set of points for each object in the animation data. In some embodiments, the animation system 200 may determine a large number of point positions for the animated object. In other embodiments, the animation system 200 may determine a small number point positions. In some embodiments, the number of point positions may be pre-defined by a user and the placement of the point positions may be determined by the animation system 200. In other embodiments, the number of point positions may be pre-defined by a user selecting a specific distance between each point position.

In step 630, the animation system 200 determines the positions of each point in the set of points for the object in a first animated sequence and a second animated sequence. Once the animation system 200 has determined the set of point for an object, the animation system 200 then determines the position of each point in the set of points for certain frames in the animated sequences. For example, if the start of the second animated sequence is to be appended to the end of the first animated sequence, the animation system 200 may evaluate the final frame of the first animated sequence and the first frame of the second animated sequence. For example, the animation system 200 may determine the positions of point positions 306a and 307a in frame 300, and the positions of corresponding point positions 306b and 307b in frame 301 in FIG. 3. The position data for each point may include the (x, y, z) coordinates indicating the position of the point in a three-dimensional space. In some embodiments, the position data may also include a time and frame data indicating the frame of an animated sequence in which the position data for the point is related to.

In step 640, the animation system 200 determines the deviations (i.e., spatial distances) between corresponding point positions of the object in the animation sequences. FIG. 4 illustrates the movement between the first frame 300 and second frame 301 shown in FIG. 3. As depicted, the point positions 306a, 306b, 307a, and 307b are plotted in the same positions as shown in FIG. 3. Once the position data for each point position is obtained, the animation system 200 can determine the spatial distance between corresponding points. For example, the three-dimension (x, y, z) coordinates of point position 306a and the three-dimension (x, y, z) coordinates of point position 306b can be compared to determine the distance between the two points. In some embodiments, the deviations are Euclidean distances in three-dimensional space between the first positions and the second positions, which is the ordinary measurable distance between two points.

In step 650, the animation system 200 determines a blending weight function for each point based on the determined deviations. The animation system 200 determines the blending weight function for each point based on the determined deviation for each point. In some embodiments, when a particular point position has moved a large distance between frames, resulting in a larger deviation, the blending weight function may use a larger blend window. When a particular point position has moved less, resulting in a smaller deviation, the blending weight function may use a smaller blend window.

Figure 7A:
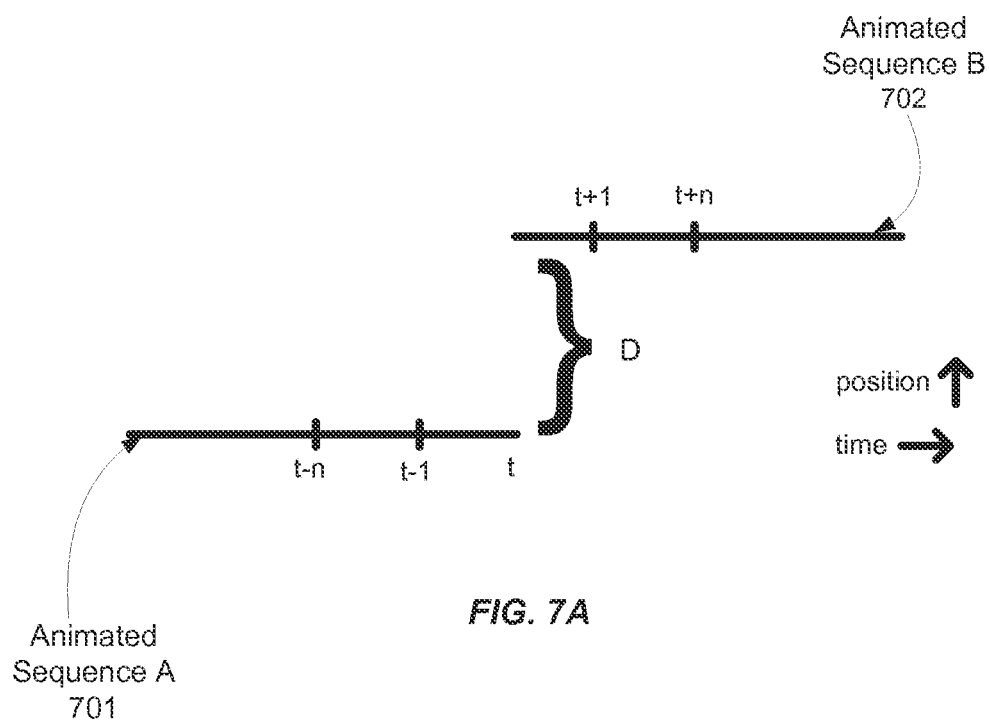
FIGS. 7A-7C illustrate exemplary plotted positions of frames from the two sequences of animated data and exemplary blend weighing functions that may be used to practice some embodiments of the invention.

As depicted in FIG. 7A, at time t, there is a deviation, D, between Animated Sequence A 701 and Animated Sequence B 702. Time t indicates the frame where the two animated sequences 701 and 702 are to be joined. Variable n represents a number of frames of each animated sequence included in a blend window.

Figure 7B:
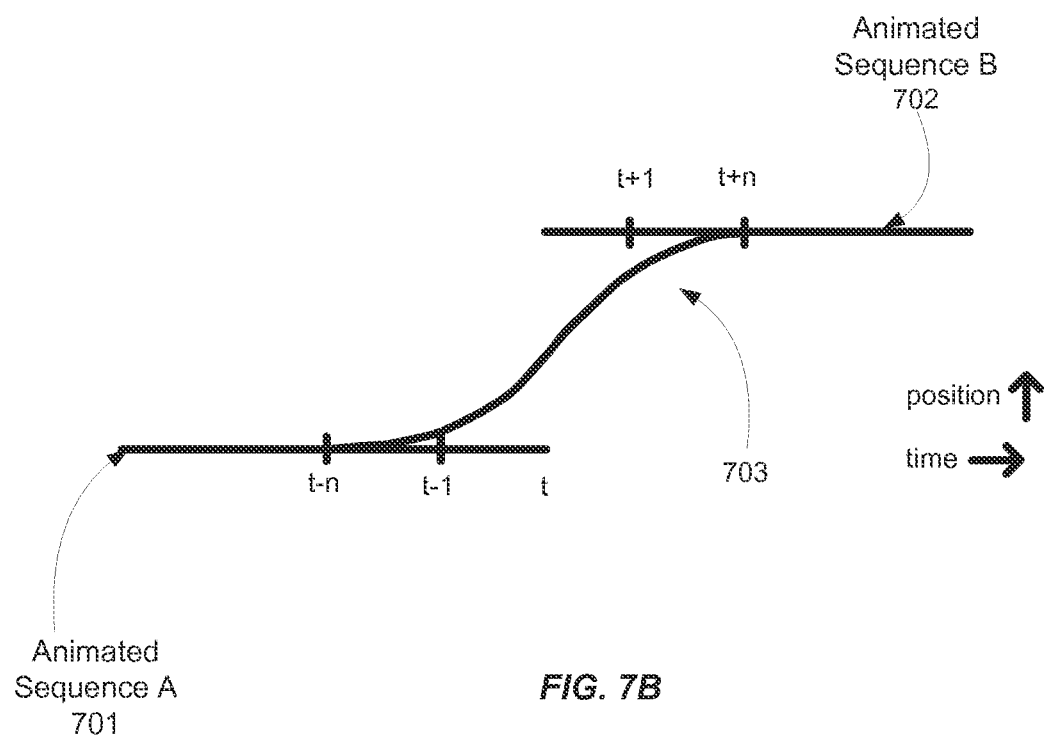

FIG. 7B illustrates an exemplary blending weight function plotted between the two animated sequences 701 and 702. The blending weight function is plotted from frame (t−n) on Animated Sequence A 701 to frame (t+n) on Animated Sequence B 702. Thus, as depicted, the blend window is 2 n frames in size. While FIGS. 7A and 7B are illustrated in one-dimensional form, blended point positions may be expressed and determined in three-dimensional form. The blending weight function is based on the size of the blending window and the determined deviation between the two animated sequences 701 and 702.

Figure 7C:
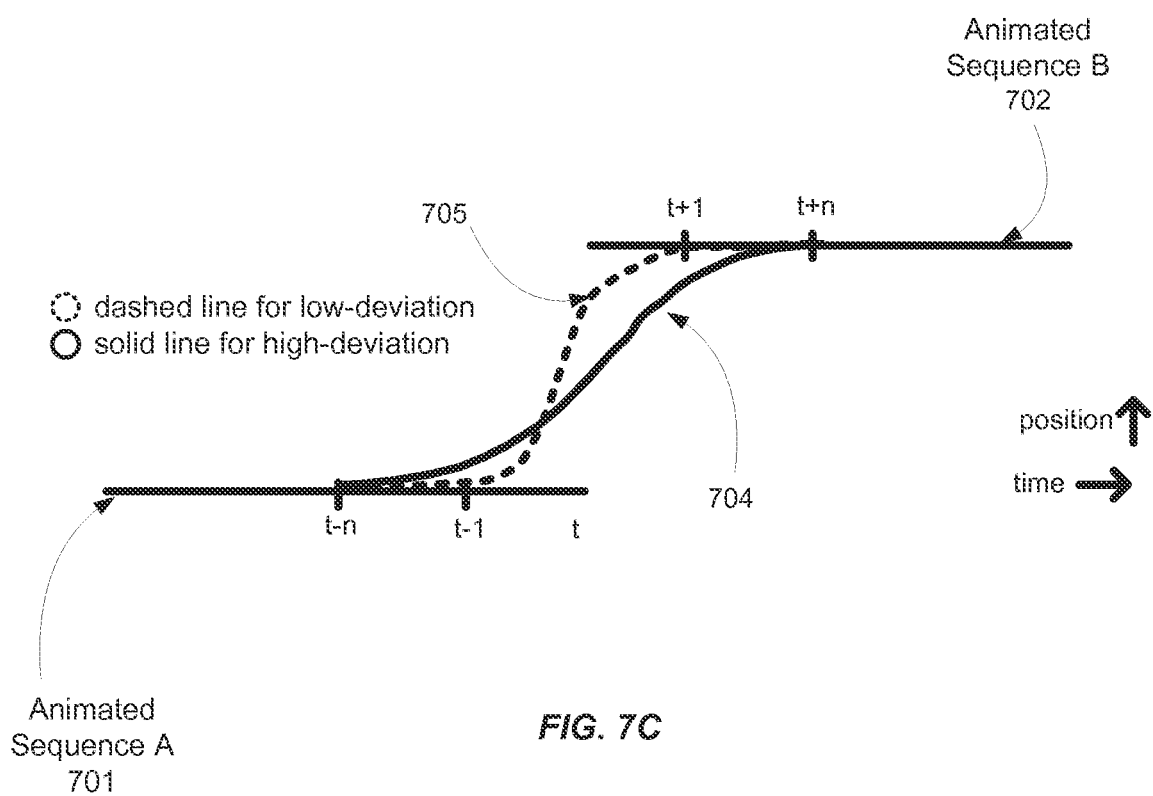

FIG. 7C depicts an alternative embodiment where the size of the blending window is static for all point positions within an object, regardless of the size of the deviations between corresponding points on two or more animated sequences. In such embodiments, the blending weight functions may be different based on the determined deviations, while the size of the blending window is uniform for all point positions (in the case of FIG. 7C, 2 n in size). Although the size of the blending window is the same for both points, the size of the deviations may be different. The different deviations may result in different blending weight functions.

For example, the blending weight function for a point position with a large deviation, when plotted, may be represented by a function with a smaller slope at the midpoint of the blending weight function, while the blending weight function for a point position with a small deviation may be represented by a function with a larger slope at the midpoint. FIG. 7C depicts a blending weight function with a large (or high) deviation 704 and a blending weight function with a small (or low) deviation 705. FIG. 7C depicts two blending weight functions 704 and 705 with identical blending window sizes. In other scenarios, the sizes of the blending windows may be different for each blending weight function.

In step 660, using the blending weight functions, the animation system 200 determines blend positions for each point position of the object in the animation sequence. Determining the blend positions for each point position is based on the determined blending weight function for the point position, and the size of the blending window based on the determined deviation for the point position.

Figure 8:
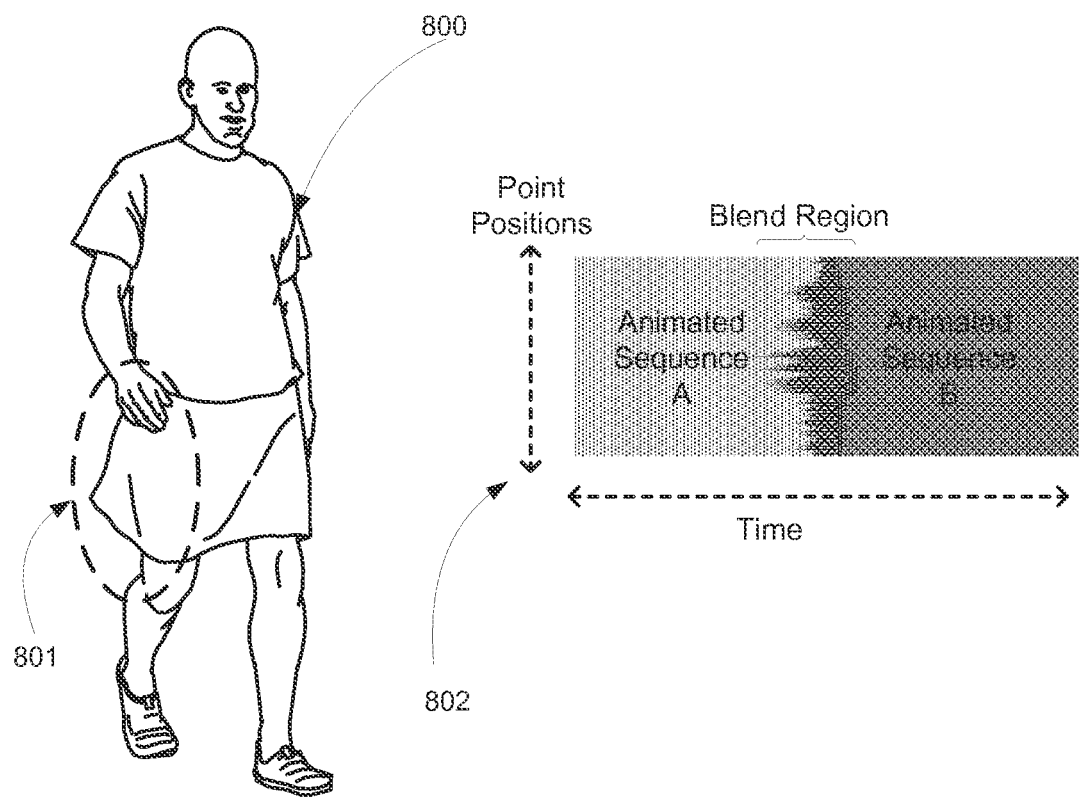
FIG. 8 illustrates the result of a weighted blending of the frames from the two sequences of animated data depicted in FIG. 3 according to some embodiments of the invention.

In step 670, the animation system 200 generates blended frames of animation data based on the determined blend positions. The animation system 200 may use the model generator 220 to generates the blended frames of animation data. The blended frames of animation data may then be stored in model storage 230 and/or rendered by the renderer 260. As illustrated in FIG. 8, the blended frames of animation data produces a blend of the animated sequences. Unlike the blending done with uniform blending windows depicted in FIG. 5, the animated model 800 has no intersections in the same region 801. As shown on the charted graph 802, the amount of blending at each point in the blend window may vary based on the determined blend positions for each point of the object in the animation sequence.

IV. Reducing Jitter Through Data Dependent Blending

As described previously with respect to FIG. 3, point positions for an animated model may be used to indicate separate portions of the animated model. For example, point positions 306a and 307a are the positions of the particular portions of the garment 304 in the first frame 300.

Also, as described previously, the animated character 302 in the first frame 300 can be generated using a kinematics engine such that the coordinates of portions of the animated character (e.g., elbow, leg, arm) are specified by the animator for each frame. Generating animated data for the garment 304 may require depicting more realistic movement (e.g., flowing cloth). As such, the garment 304 may be animated in compliance with the dictates of a physics engine or simulation that applies forces from wind, character movement, interactions, etc. to the garment 304 and determines new positions in various frames for the garment 304 based on the rules applied by a simulation engine.

In some situations, the animated character 302 may be modeled to move quickly in an animated sequence. In such situations, as the garment 304 may be modeled separately from the animated character 302, the garment 304 may go out of sync with the animated character 302. This can result in the creation of intersections between the garment 304 and the body of the animated character 302. A similar situation may occur with other animated objects, including hair and props.

A. Watered and Filtered Point Positions

Unfiltered point positions are the original positions of the point positions of the animated object. Thus, for example, the positions of points 306a, 306b, 307a, and 307b, taken as shown in FIG. 3, may be considered unfiltered point positions. A filtered point position for each point position of the animated object may be used to minimize the number and frequency of intersections between the garment 304 and the body of the animated character. Typically, the filtered point position for a given point in a given frame is determined by averaging the point positions over specified filter length value. In some embodiments, the filter length value is a predefined number of frames of animation in an animation sequence surrounding the given frame in the animated sequence.

For example, a user may define that for each point position, the filtered point position is the average point position for the given point, in (x, y, z) coordinate values, of the range from two frames prior to the given frame and to the two frames after the given frame (i.e., a filter length value of 5). Thus, five frames of animation data are used to determine the filtered point position. It should be understood that this is merely an exemplary range and any size range may be specified by the user.

An exemplary equation for determining the filtered point position for point position X in given frame F, is as follows:

$$X_{FilteredPosition} = \frac{1}{2n+1} \sum_{k=-n}^{n} X_{UnfilteredPosition}(F+k)$$

In this equation, n represents the number of frames prior to the given frame F in which the point position of X should be determined. For example, if F=10, and n=2, the animation system 200 will use the above equation to sum the point positions of X across frames eight through twelve, and then divide the point positions sum by five, the number of frames evaluated.

B. Comparing Filtered Point Positions and Unfiltered Point Positions

Once the animation system 200 has determined the filtered point position for the given point position, the animation system may conduct a comparison between the filtered point position and the unfiltered point position. In some embodiments, the absolute value of the difference between the filtered and unfiltered point positions is determined. For example, the (x, y, z) coordinates of the filtered point position and the (x, y, z) coordinates are considered and a vector length between the two coordinates is calculated. Other embodiments may do a comparison with one or two of the dimensions in order to calculate the value of the distance between the filtered point position and the unfiltered point position. This comparison is conducted for all point positions in the animated sequence.

C. Adjusting Point Positions Based on Thresholds

Once the distance between the filtered point position and the unfiltered point position has been determined, the animation system 200 may determine an adjusted point position.

In addition to specifying the number of frames of an animated sequence to determine filtered point positions, the user may also specify threshold values to determine what values (e.g., the filtered point position, unfiltered point position, or blend of the filtered and unfiltered point positions) to use as the adjusted point position for the given point position. For example, the user may specify a lower bound (distance_min) and an upper bound (distance_max), and determining adjusted point positions is based on at least the distance between the filtered point position and the unfiltered point position, and its relation to the specified lower and upper bounds. The lower bound and upper bound can represent minimum and maximum distances such that when the filtered point positions is below the minimum distance, the point position of the given point is adjusted to the filtered point position, and when the filtered point positions is above the maximum distance, the point position of the given point is kept as the unfiltered point position.

The adjusted point position for the given point position may be determined by the animation system 200 as follows. Given $X_{UnfilteredPosition}$ and the determined $X_{FilteredPosition}$, and the user-defined thresholds, distance_min and distance_max, the animation system 200 may compute an adjusted point position for point position X, $X_{AdjustedPosition}$, according to the following:

$$X_{AdjustedPosition} = [(1-t) \times X_{FilteredPosition}] + [t \times X_{UnfilteredPosition}]$$

The value of an adjustment filter, t, may be determined according to the following:

$$d = |distance(X_{FilteredPosition}, X_{UnfilteredPosition})|$$

if (d≤distance$_{13}$ min)
   t=0
else if (d≥distance_max)
   t32 1
else
   t=smoothstep(distance_min,distance_max,d)

Using the above formula, when the absolute value of the determined distance between the filtered point position and the unfiltered point position, d, is less than distance_min, the given point position will be filtered completely (i.e., the adjusted point position will be the determined filtered position). The determined distance being less than distance_min may indicate that the animated character 302 is moving a small amount.

When the determined distance between the filtered point position and the unfiltered point position is greater than distance_max, the given point position will not be filtered at all (i.e., the adjusted point position will be the original unfiltered position). The determined distance being greater than distance_max may indicate that the animated character 302 is moving a large amount.

When the determined distance between the filtered point position and the unfiltered point position is a value between distance_min and distance_max, the given point position will be filtered partially based on smooth interpolation (i.e., using a smoothstep function), resulting in a blend of the unfiltered point position with the filtered point position.

Embodiments of the invention can be used to reduce jitters and pops in the animation data regardless of whether the animated sequence involves slow or fast movement as the filtered point position will be a reduced factor during faster movement, as only some or none of the filtered point position may be used to determine the adjusted point position.

D. Exemplary Method

Figure 9:
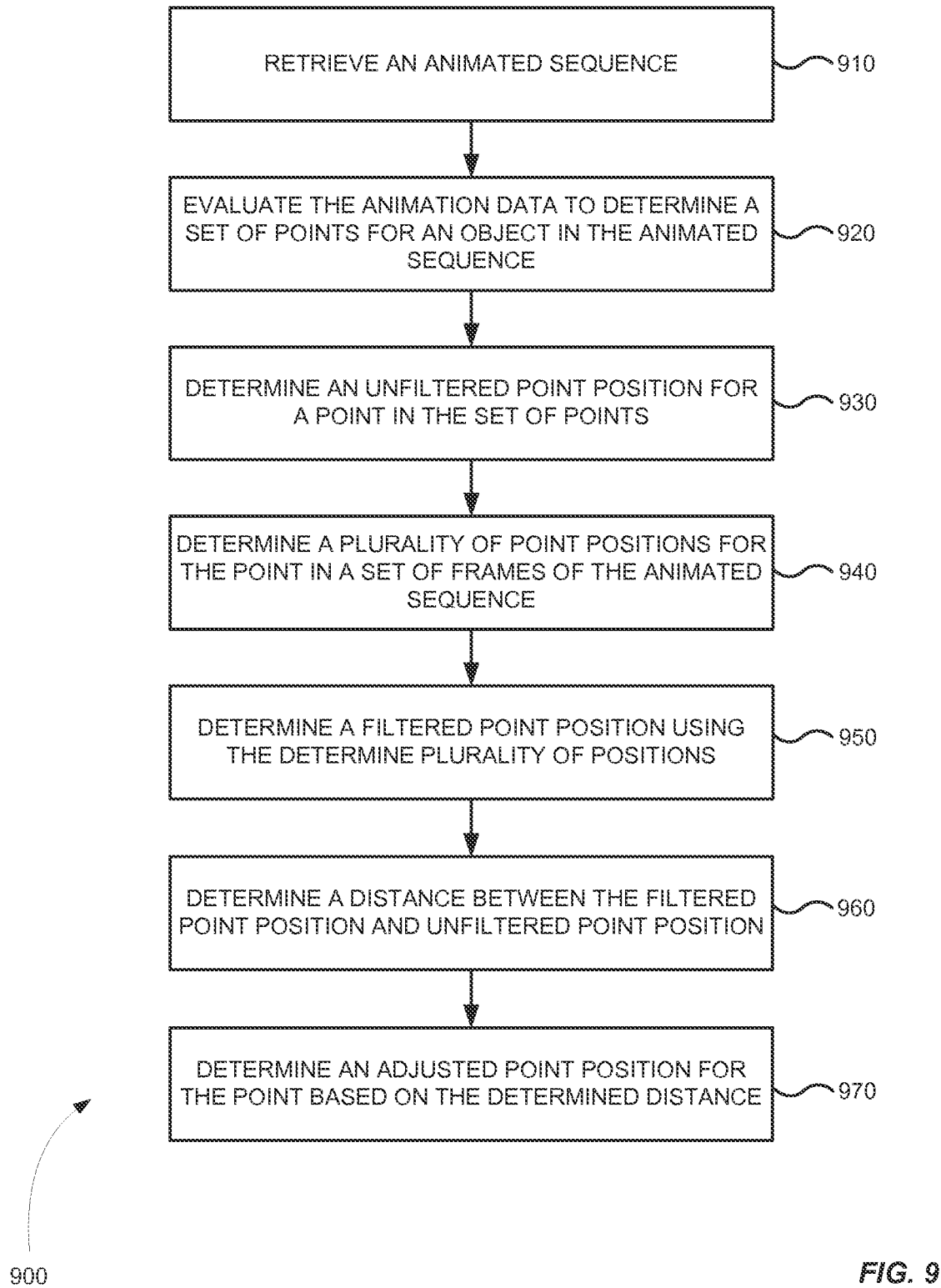
FIG. 9 is a simplified flowchart of a method in various embodiments for determining the blending of point positions in an animated sequence.

FIG. 9 is a flowchart illustrating a method 900 of operation of an animation system for blending frames of an animated sequence to reduce jitter. In some embodiments, the method 900 is performed to evaluate each animation variable associated with a frame of animated data. The processing depicted in FIG. 9 may be performed by software modules (e.g., instructions or code) executed by a processor of a computer system, by hardware modules of an electronic device, or combinations thereof. Method 900 is described with respect to determining the unfiltered and filtered point positions for a single point in a set of points of an animated object. However, in embodiments of the invention, multiple points may be evaluated by the animation system (e.g., system 200) to determine the unfiltered and filtered point positions for each of the multiple points. In some embodiments, the evaluation of multiple point positions may be conducted simultaneously.

Figure 10:
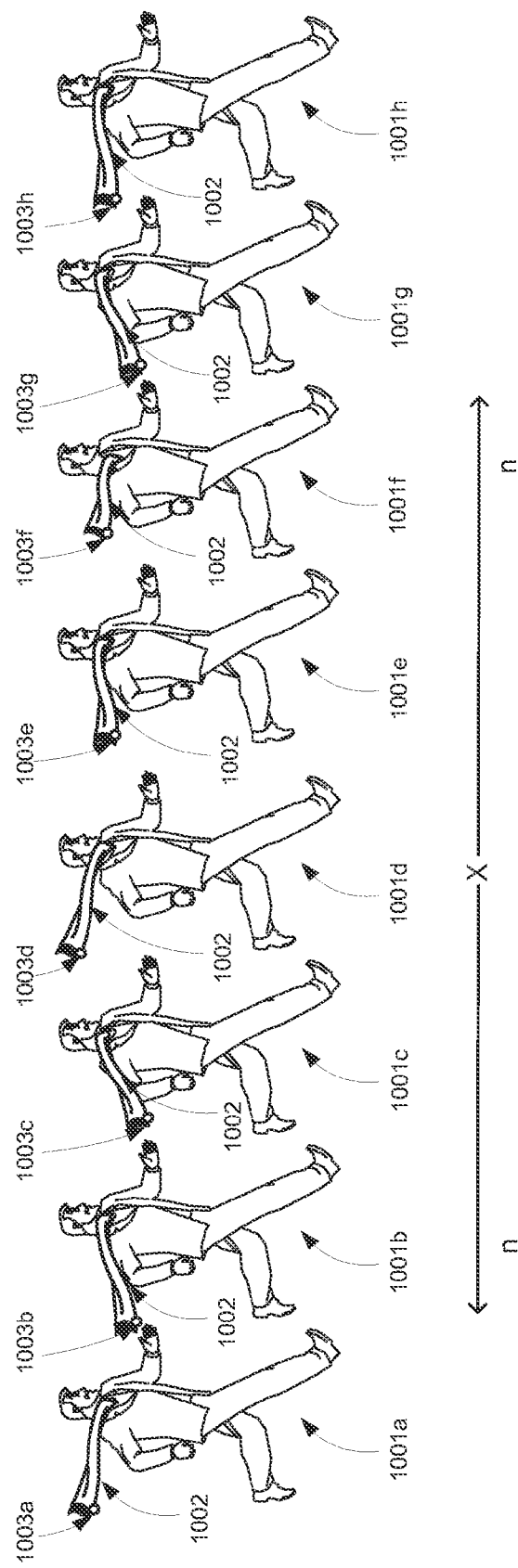
FIG. 10 illustrates exemplary frames of an animated character and object in an animated sequence that may be used to practice some embodiments of the invention.

As illustrated in FIG. 9, the method begins 910 with the animation system 200 retrieving an animated sequence, such as the animated sequence 1000 depicted in FIG. 10. In some embodiments, the animated sequence may be inputted by a user into the animation system 200 as pre-formed animation inputs 250 or may be generated by the model generator 220 based on user specifications and model inputs 210. The animated sequences may be in the form of animation data.

Once the animated sequence 1000 is retrieved, in step 920, the animation system 200 evaluates the animation data to determine a set of points for an object 1002 (i.e., the scarf) in the animated sequence 1000. In some embodiments, the animation data may include more than one object. In such embodiments, the animation system 200 may determine a separate set of points for each object in the animation data. In some embodiments, the animation system 200 may determine a large number of point positions for the animated object. In other embodiments, the animation system 200 may determine a small number point positions. In some embodiments, the number of point positions may be pre-defined by a user and the placement of the point positions may be determined by the animation system 200. In other embodiments, the number of point positions may be pre-defined by a user selecting a specific distance between each point position.

In step 930, the animation system 200 determines an unfiltered point position for a point in the set of points for the object 1002 in the animated sequence. Once the animation system 200 has determined the set of points for the object 1002, the animation system 200 may then determine the point position of a point in the set of points for a certain number of frames in the animated sequence.

For example, with respect to FIG. 10, the animation system may evaluate the animated sequence 1000 depicted individually as animated frames 1000a-h. Assuming the animation system 200 is evaluating frame 1000d, point position 1003d may be selected for evaluation. The unfiltered point position may be the (x, y, z) coordinates for the point 1003d. In other embodiments, the unfiltered point position may be a one-dimensional or two-dimensional coordinate for the point 1003d.

In step 940, the animation system 200 determines a plurality of point positions for the point in a set of frames of the animated sequence. As shown in FIG. 10, points 1003a-h represent the same point on the animated object 1002 over a series of animated frames 1000a-h. The number of frames evaluated by the animation system 200 is based on pre-defined settings. As shown in FIG. 10, frame X (i.e. frame 1003d) may be a given point position, and n is the number of frames in either direction of frame X, in addition to frame X, that are evaluated in determining the filtered point position.

For example, the user may define that the animation system 200 should evaluate from two frames prior to the frame being evaluated through two frames following the frame being evaluated (i.e., a total of five frames, 1000b-f). The animation system 200 determines the point positions for the point in each of the frames. The result may be the (x, y, z) coordinates for each of the plurality of point positions. In other embodiments, the results may be one-dimensional or two-dimensional coordinates for each of the points 1003b-f.

In step 950, the animation system 200 determines a filtered point position using the determined plurality of point positions. As described previously, in some embodiments, the filtered point position for the point is determined by averaging the point positions for the point determined over the set of frames. For example, the point positions of points 1003b-f are averaged to determine a filtered point position for point 1003d in frames 1000d.

In step 960, the animation system 200 determines the distance (i.e., spatial distances) between the filtered point position and the unfiltered point position. Once the filtered point position is determined, the animation system 200 can determine the spatial distance between the filtered point position and the unfiltered point position. In some embodiments, the distance is the length of a three-dimensional line between the unfiltered point position and the filtered point position In step 970, the animation system 200 determines an adjusted point position for the point based on the determined distance. Once the distance between the filtered point position and the unfiltered point position is determined, the determined distance is compared to user-defined thresholds. For example, the user may pre-define an upper bound (distance_max) and a lower bound (distance_min) that are used to determine how the adjusted point position is determined.

In some embodiments, if the determined distance is below the lower bound, the filtered position is used as the adjusted position. If the determined distance is above the upper bound, the unfiltered position is used as the adjusted position. If the determined distance is above the lower bound and below the upper bound, a smoothstep function is used. The smoothstep functions uses the lower bound value, the upper bound value, and the determined distance to determine proportions of the filtered point position and the unfiltered point position to use in determining the adjusted position.

Figure 11:
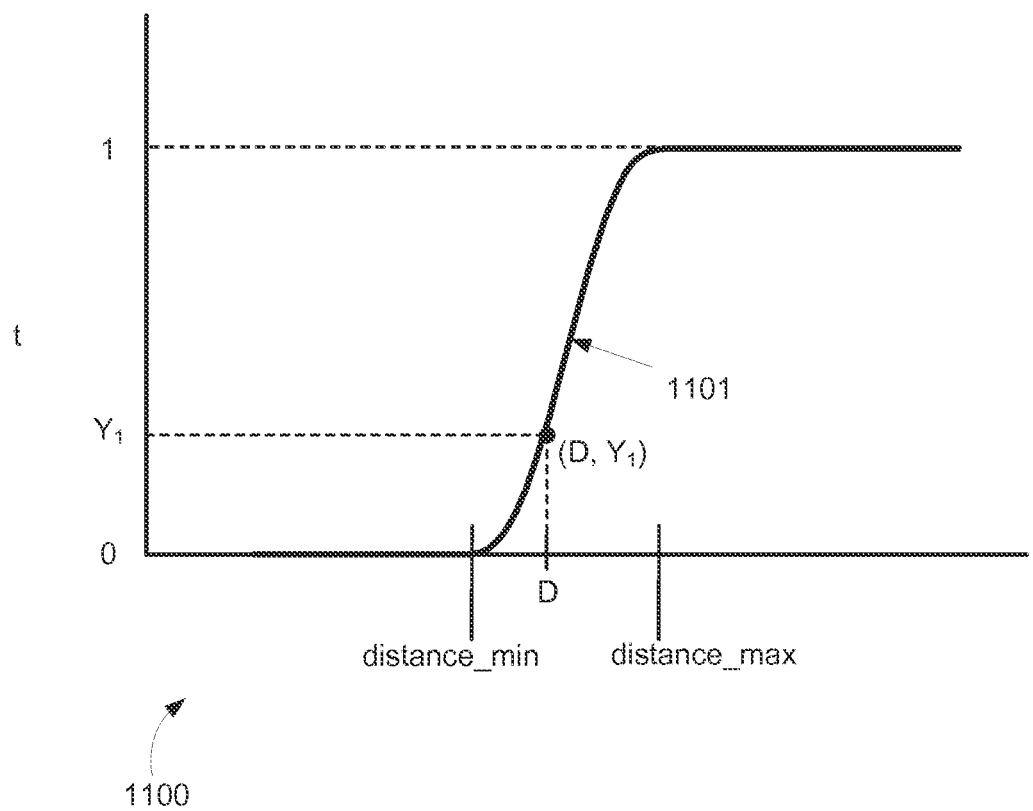
FIG. 11 illustrates an exemplary plot of a smoothstep function according to some embodiments of the invention.

An exemplary smoothstep function is depicted on the graph 1100 in FIG. 11. The smoothstep function 1101 goes from 0 to 1, and starts and ends with a 0 slope. The distance_min and distance_max values are plotted along the x-axis, and smoothstep function 1001 goes from 0 to 1, starting at distance_min and ending at distance_max. The determined distance, D, is plotted along the x-axis, and the intersection point (D, $Y_1$) is determined representing the point where the determined distance intersects the smoothstep function 1101. The y-axis coordinate, $Y_1$, of the intersection point is the value of t used to determine the adjusted position, using the following:

$$X_{AdjustedPosition} = [(1-t) \times X_{FilteredPosition}] + [t \times X_{UnfilteredPosition}]$$

The resulting adjusted point position from this equation may be a blend of the filtered point position and the unfiltered point position.

Once the adjusted point position for the point is determined the animated data for the animated object may be altered by the animation data engine 240. The animation system may then generate adjusted frames of animation data based on the determined adjusted point position.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosures and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

Where "each" is used with reference to a set of things with a characteristic and/or a feature, it is not meant to exclude the case of a set of things each having the characteristic or feature and additional things beyond the set that do not necessarily have that characteristic or feature.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

The specification and drawings are, accordingly, to be regarded in an illustrative rather than a restrictive sense. It will, however, be evident that various modifications and changes may be made thereunto without departing from the broader spirit and scope of the application as set forth in the claims.

What is claimed is:

1. In a computer animation system that generates images based on animation inputs and object data, a computer-implemented method of blending at least two animation sequences being joined such that objects are viewed as having continuity across a join of sequences, the computer-implemented method comprising:
   determining, by one or more processors, a set of points for an object, the points representing separate portions of the object;
   determining, by the processor, first positions of the set of points at an end of a first animation sequence and second positions of the set of points at a start of a second animation sequence that is to be appended to the end of the first animation sequence;
   determining, by the processor, deviations between the first positions and the second positions;
   determining, by the processor, a blend weighting function for each point of the set of points based on the determined deviations, wherein each blend weighting function varies based on a size of its respective determined deviation;
   determining, by the processor, blend positions for each point for each frame in a plurality of frames in a blending window, wherein the blend positions are determined by the blend weighting function for each point; and
   generating, by the processor, blended frames of animation data based on the determined blend positions.

2. The computer-implemented method of claim 1, wherein the first animation sequence is the same as the second animation sequence, forming an animation loop when the end of the first animation sequence is appended to the start of the second animation sequence.

3. The computer-implemented method of claim 1, wherein the first animation sequence and the second animation sequence are different animation sequences.

4. The computer-implemented method of claim 1, wherein the determined deviation for a first point is determined by the position of the first point at the end of the first animation sequence and the position of the first point at the start of the second animation sequence.

5. The computer-implemented method of claim 1, wherein a slope at a midpoint of the blend weighting function is larger when the deviation is larger, than when the deviation is smaller.

6. The computer-implemented method of claim 1, wherein a size of the blending window for two points are different, wherein a size of the blending window for each point is determined based on the blend weighting function for the point.

7. The computer-implemented method of claim 1, wherein a size of the blending window for each point is based on one or more of an amount of a deviation for each point and characteristics of the object.

8. The computer-implemented method of claim 7, wherein the size of the blending window is larger when the amount of the deviation is large, and wherein the size of the blending window is smaller when the amount of the deviation is small.

9. The computer-implemented method of claim 1, wherein the object is cloth or hair.

10. The computer-implemented method of claim 1, wherein the deviations are Euclidean distances in three-dimensional space between the first positions and the second positions.

11. A computer product comprising a non-transitory computer readable medium storing a plurality of instructions that when executed control a computer system to blend at least two animation sequences being joined such that objects are viewed as having continuity across a join of sequences, the instructions comprising:
   determining a set of points for an object, the points representing separate portions of the object;
   determining first positions of the set of points at an end of a first animation sequence and second positions of the set of points at a start of a second animation sequence that is to be appended to the end of the first animation sequence;
   determining deviations between the first positions and the second positions;
   determining a blend weighting function for each point of the set of points based on the determined deviations, wherein each blend weighting function varies based on a size of its respective determined deviation;
   determining blend positions for each point for each frame in a plurality of frames in a blending window, wherein the blend positions are determined by the blend weighting function for each point; and
   generating blended frames of animation data based on the determined blend positions.

* * * * *